United States Patent [19]

Dearman

[11] Patent Number: 4,553,305

[45] Date of Patent: Nov. 19, 1985

[54] PIPEFITTER'S SCRIBING AND SPACING TOOL

[76] Inventor: Timothy C. Dearman, P.O. Box 937, Pearland, Tex. 77588

[21] Appl. No.: 554,570

[22] Filed: Nov. 23, 1983

[51] Int. Cl.⁴ .............................................. B23Q 3/18
[52] U.S. Cl. ...................................... 29/272; 29/281.5; 228/49.3; 269/43; 269/87; 269/203; 269/228; 269/902; 33/21 C
[58] Field of Search ................... 228/49 B, 49 R, 56.5; 269/87, 228, 43, 902, 203, 258–264; 29/272, 281.5, 282, 268, 270; 81/468, 426; 7/125, 170; 33/21 C, 21 R, 74 N

[56] References Cited

U.S. PATENT DOCUMENTS 4,483,059 11/1984 Dearman ............................... 29/272

Primary Examiner—Nicholas P. Godici
Assistant Examiner—Chris McKee
Attorney, Agent, or Firm—Learman & McCulloch

[57] ABSTRACT

A tool adapted for use by a pipefitter in welding a length of pipe to a fitting in which one end of the pipe is accommodated with a predetermined spacing between the end of the pipe and an internal shoulder within the fitting. The tool has jaws which may be clamped on the pipe when the end of the latter is in abutting engagement with the shoulder of the fitting and includes spacers that are movable to a position between the jaws and the end of the fitting to provide a predetermined spacing between the free end of the pipe and the shoulder of the fitting. The tool also includes scribers for marking the pipe and the fitting in such manner as to facilitate verifying that such gap has been provided between the end of the pipe and the shoulder of the fitting.

27 Claims, 10 Drawing Figures

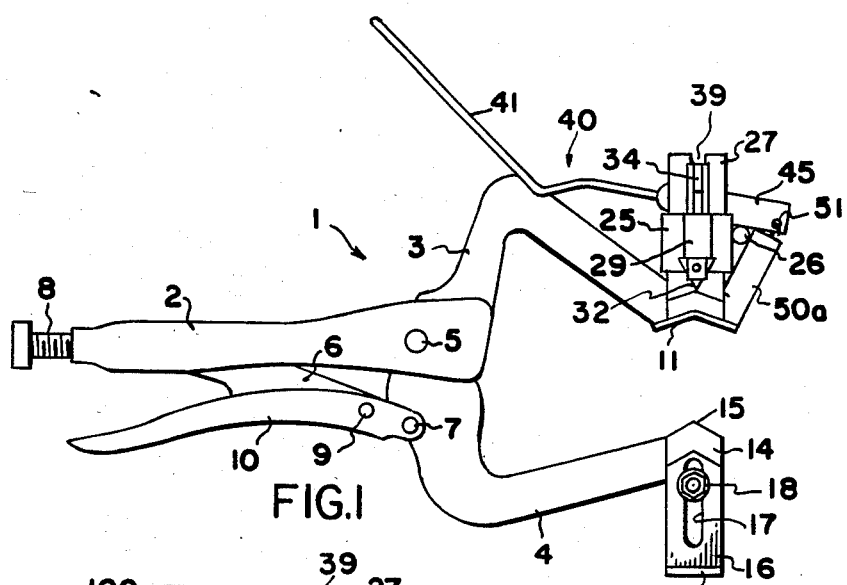
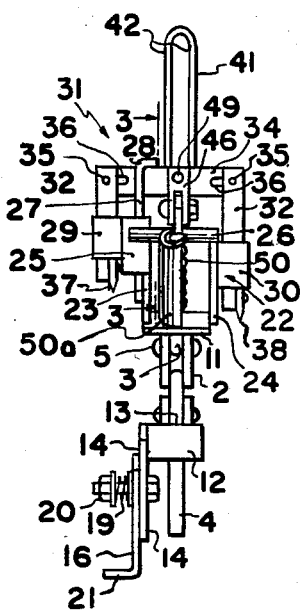
FIG.1
FIG.2
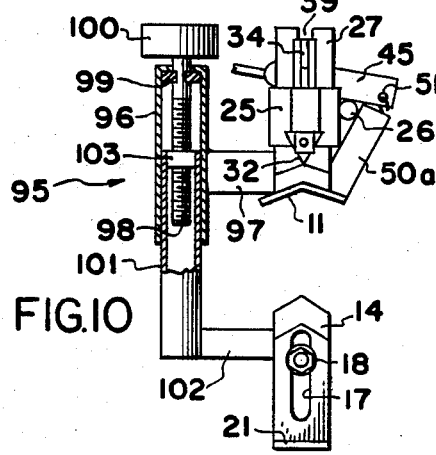
FIG.10
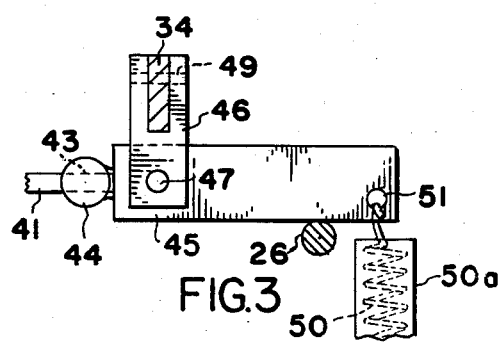
FIG.3
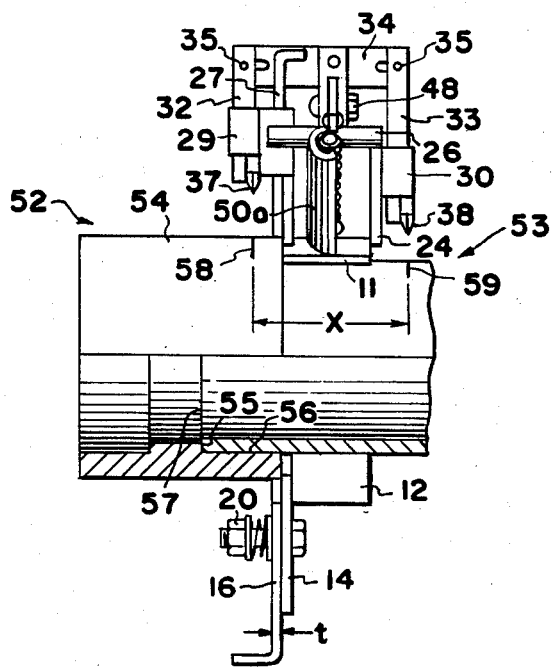
FIG.4
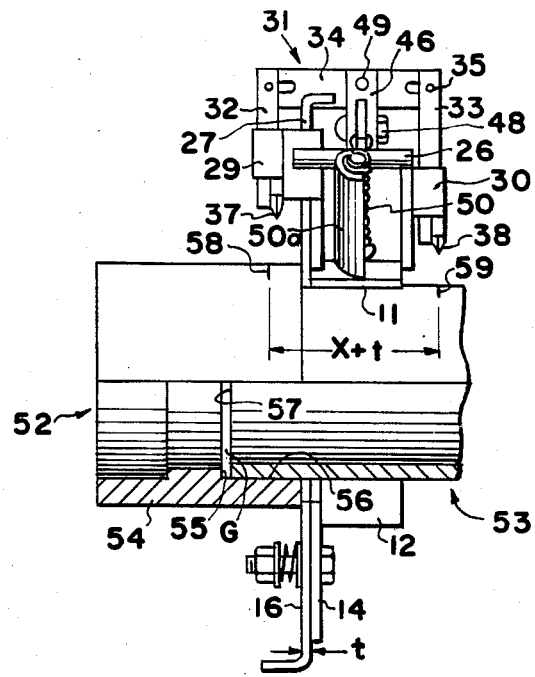
FIG.5

PIPEFITTER'S SCRIBING AND SPACING TOOL

BACKGROUND OF THE INVENTION

The invention relates to a tool for use by a pipefitter in welding to one end of a pipe a fitting having an internal shoulder. When welding such a fitting to a pipe it is common practice to thrust the pipe into the fitting until the end of the pipe abuts the shoulder. The welding operation should not take place with the pipe abutting the shoulder, however, because of the likelihood that the weld will crack or break due to thermal expansion and contraction of the pipe and fitting. Accordingly, proper practice requires the provision of a gap or clearance between the free end of the pipe and the shoulder of the fitting. Certain standards have been specified concerning the width of the gap that should be provided between the pipe end and the shoulder and most of these standards specify a gap of about 0.125 inch.

Various proposals have been made heretofore which make possible the provision of a gap of the required size between the shoulder of a fitting and the adjacent end of a pipe. For example, a widely used gapping tool is disclosed in Dearman U.S. Pat. No. 4,306,345. The proper use of such a tool provides an easy way of precisely locating a a pipe and a fitting in the proper relative positions prior to commencing the actual welding operation.

Even if the Dearman tool has been properly used, an external inspection of the pipe and fitting following the completion of the weld will not reveal to the inspector whether or not the proper gap exists between the pipe and the shoulder. This problem has existed for a great many years without a really effective solution having been found. What is believed to be the best solution heretofore proposed to the problem comprises the tool disclosed in Dearman copending application Ser. No. 486,565, filed Apr. 20, 1983, now U.S. Pat. No. 4,483,059. That tool includes a clamp and spacers similar to those associated with the tool disclosed in U.S. Pat. No. 4,306,345 and, in addition, includes a pair of manually manipulatable scribes which may be operated individually to inscribe the fitting and the pipe while the fitting is maintained with its shoulder in abutting engagement with the end of the pipe. Proper use of the two scribes will result in marks being placed on the fitting and on the pipe and the distance between the two marks will correspond to the spacing between the two scribes. Thereafter, the pipe and the fitting will be adjusted relatively to one another so as to enable the spacers to provide a gap of predetermined width between the fitting shoulder and the pipe end. This relative adjustment of the pipe and the fitting will result in an elongation of the distance between the two marks inscribed on the fitting and on the pipe. Thus, when an inspector measures the distance between the two marks, he will be able to determine from the spacing between the two marks whether a gap was or was not provided between the pipe and the fitting shoulder prior to the commencement of welding.

Although the tool illustrated in the above identified copending application makes possible the absence or presence of the gap to be determined from an external inspection, the operation of the tool is not as simple as is desirable. This is because the operator must maintain the fitting shoulder snugly against the end of the pipe while manipulating the scribes. Since both scribes must be manipulated, and since one hand of the operator usually is required to hold the fitting against the pipe, the operator can manipulate only one scribe at a time. Thus the inscribing of the pipe and the fitting takes longer than would be the case if both scribes could be manipulated simultaneously, and the inability to operate both scribes simultaneously leads to the possibility that one or the other of the scribes may not be operated at all, thereby rendering the tool ineffective for one of its intended purposes. Further, the necessity of having to operate the scribes individually and sequentially makes possible relative movement between the pipe and the fitting between scribing operations with the result that the inscribed marks may be so located as to prevent an accurate measurement being taken between them.

Appartus constructed in accordance with the disclosed invention retains the advantageous characteristics of the tools disclosed in the aforementioned patent and copending application and improves upon many of the operating characteristics thereof.

SUMMARY OF THE INVENTION

A tool constructed according to all embodiments of the invention disclosed herein comprises a clamp having jaws operable to grip a pipe adjacent that end thereof which is to be accommodated in and welded to a fitting having an internal shoulder therein. The jaws may be placed on the pipe in such position that, when the end of the pipe abuts the shoulder of the fitting, the end of the fitting will abut the jaws.

According to one embodiment the clamp is provided adjacent one of the jaws with a bracket on which a yoke is mounted. The yoke includes a pair of arms, each of which carries an inscribing marker or scribe. An operating lever is coupled to the yoke to move the latter from an inactive position in such direction as to cause the scribes to engage the pipe and the fitting simultaneously and inscribe a mark on each. While maintaining the pipe clamped between the clamp jaws, the pipe, the fitting, and the clamp may be relatively rotated, if desired, to increase the size of the marks inscribed on the pipe and the fitting. A spring acts constantly on the operating lever to restore the yoke to its inactive position whenever the operating lever is released.

Apparatus constructed in accordance with another embodiment of the invention includes a similar yoke, but in this instance the yoke is spring biased to a neutral inactive position from which it may be moved by operation of a lever assembly and in a direction away from the pipe and the fitting. Such movement of the yoke stresses the springs. Following movement of the yoke a predetermined distance away from its inactive position, the yoke auto matically is released from the operating lever assembly following which the springs drive the yoke forcibly toward the pipe and fitting thereby enabling the scribes to engage the mark the pipe and the fitting simultaneously.

In each of the above referred to embodiments the inscribing of the pipe and the fitting may be accomplished by an operator using only one hand. This enables the operator's other hand to be free to maintain the pipe and the fitting in proper positions relative to one another.

THE DRAWINGS

Apparatus constructed in accordance with the invention is disclosed in the following description and in the accompanying drawings, wherein:

FIG. 1 is a side elevation of a tool according to one embodiment of the invention;

FIG. 2 is an end elevational view;

FIG. 3 is an enlarged sectional view taken on the line 3—3 of FIG. 2;

FIG. 4 is a view, partly in end elevation and partly in section, of the tool applied to a pipe and a fiting mounted on the pipe;

FIG. 5 is a view like FIG. 4, but illustrating the pipe and the fitting in adjusted positions;

FIG. 10 is a view similar to FIG. 2, but illustrating a modified form of clamp.

DESCRIPTION OF PREFERRED EMBODIMENTS

Figure 6:
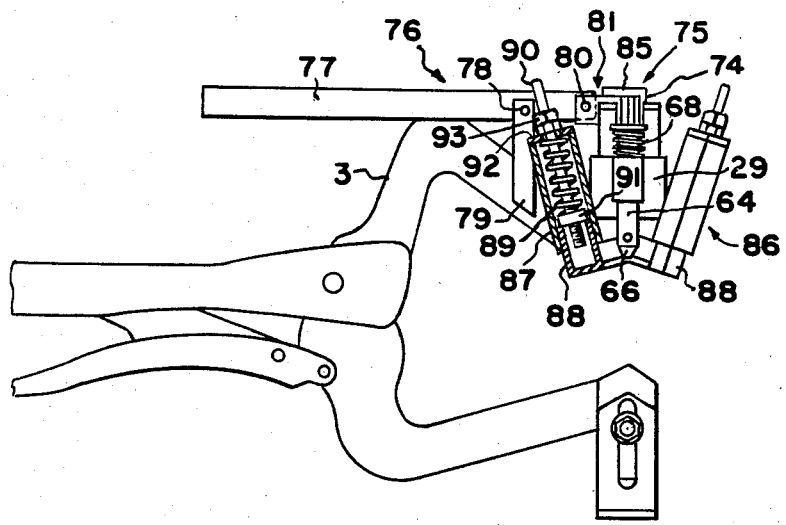
FIG. 6 is a view similar to FIG. 1, but illustrating a further modified embodiment of the invention.
Figure 7:
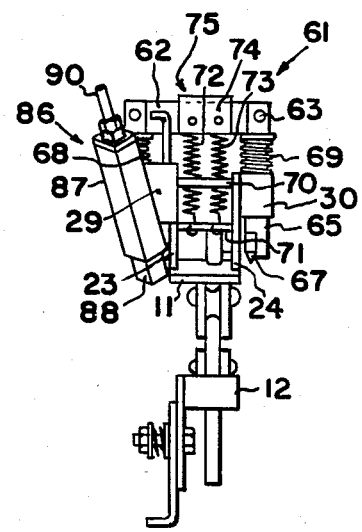
FIG. 7 is an end elevational view of the tool shown in FIG. 6.
Figure 8:
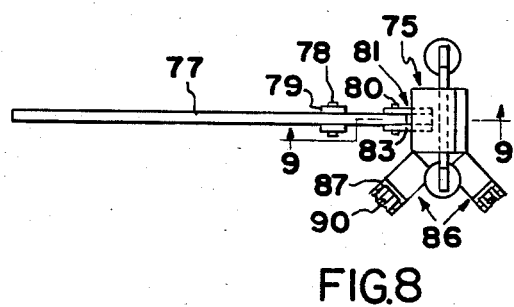
FIG. 8 is a fragmentary, top plan view.

A tool constructed in accordance with the embodiment illustrated in FIGS. 1–5 comprises a clamp 1 of known construction having a handle 2 to one end of which is fixed an arm 3. A second arm 4 is pivoted to the handle 2 by means of a pin 5 so as to enable relative movement of the free ends of the arms toward and away from one another about the axis of the pivot pin. A link 6 has one end pivoted to the arm 4 as at 7 and its other end slidably fitted to the handle 2 for adjustment longitidinally of the latter by means of an adjusting screw 8. The link 6 is pivoted as at 9 to an operating lever 10 which also is pivoted at 7 to the arm 4. The arrangement is such that the free ends of the arms 3 and 4 may be moved toward one another so as to provide between the confronting ends of the arms a preselected spacing and the arms then may be latched in such position to prevent inadvertent enlargement of the spacing between the confronting ends of the arms. As thus far described the clamp 1 is conventional.

The free end of the arm 3 is welded or otherwise suitably fixed to an inverted V-shaped jaw 11 and the free end of the arm 4 is similarly fixed to an inverted V-shaped jaw 12 having a bearing surface 13 confronting the jaw 11.

Fixed to one end of the jaw 12 is a mounting bracket 14 having a spade-shaped end 15 corresponding to the configuration of the jaw 12 and flush with the end thereof. In sliding, face-to-face engagement with the bracket 14 is a spacer 16 having an elongate slot 17 therein through which extends the shank of a bolt 18 that is carried by the bracket 14. A spring 19 encircles the bolt shank and reacts between the bracket and a nut 20 to apply a yieldable, frictional force on the spacer 16. A right-angular flange 21 is provided on the spacer 16 to facilitate sliding movement of the latter.

A mounting bracket 22 is carried by the clamp arm 3 and comprises a pair of spaced, parallel members 23 and 24 that are welded to the jaw 11 adjacent opposite ends thereof. The member 23 is flush with the associated end of the jaw 11 and is coplanar with the bracket 14. A sleeve 25 is fixed to the member 23 adjacent the upper end of the latter and a reinforcing rod 26 spans the sleeve 25 and the member 24 to provide rigidity for the bracket members 23 and 24. Slidably accommodated in the sleeve 25 is a spacer member 27 which is coplanar with the spacer 16 and is slidable toward and away from the latter. A flange 28 is provided on the spacer 27 to facilitate its movements. Each of the spacers 16 and 27 is of uniform thickness.

Fixed to the sleeve 25 is a guide socket 29. A similar guide socket 30 is fixed to the member 24. As is clearly shown in FIG. 2, the socket 29 is at a level above that of the socket 30.

The apparatus includes a reciprocable yoke 31 comprising a pair of parallel, vertical bars 32 and 33 joined at their upper ends by a cross bar 34. The bar 32 is slidably accommodated in the guide socket 29 and the bar 33 is slidably accommodated in the guide socket 30. The cross bar 34 is secured to the bars 32 and 33 by pins 35 which extend through elongate, horizontal slots 36 in the cross bar 34.

The bar 32 supports at its lower end a preferably carbide marking member or scribe 37 and a similar marking member or scribe 38 is secured to the lower end of the bar 33. Each of the scribes has a relatively blunt, depending marking tip or edge.

The yoke 31 is vertically movable relative to the mounting bracket 22, the bars 32 and 33 being slidable in and guided by the respective guides 29 and 30. As is shown in FIG. 1, the spacer 27 is provided with a vertically extending slot 39 through which the cross bar 34 extends. The spacer 27 thus assists in guiding the yoke 31 in its movements.

Operating means 40 is provided for effecting relative movements between the yoke 31 and the mounting bracket 22. The operating means comprises a lever 41 formed of a length of stiff wire bent between its ends to form a pair of parallel limbs 42. The free ends of the limbs are frictionally accommodated in openings 43 formed in a cylinder 44 which is welded or otherwise fixed to one end of a link 45 that rests upon and extends beyond the reinforcing rod 26.

The link 45 passes beneath the cross bar 34 of the yoke 31 and is secured to a connecting bracket 46 by means of a bolt 47 and a nut 48. The bracket 46 also is secured to the cross bar 34 by means of a pivot pin 49.

A tension spring 50 extends between an anchor hook (not shown) fixed to the jaw 11 and an opening 51 in the link 45 and constantly urges the latter and the lever 41 to rock in a clockwise direction, as viewed in FIGS. 1 and 3, about a fulcrum formed by the reinforcing member 26. However, the application of a counterclockwise force on the lever 41 will enable the operating means to rock counterclockwise about its fulcrum and move the yoke 31 and its associated parts, including the scribes 37 and 38, in a direction toward the clamp jaw 12. Preferably the spring 50 is protected by a semicylindrical guard 50a fixed to the jaw 11.

FIGS. 4 and 5 indicate the manner in which the apparatus may be used to secure a fitting 52 to one end of a pipe 53. The fitting 52 has an annular body 54 provided with an internal shoulder 55 that is axially spaced inwardly from the end of the fitting. The fitting has at one end a bore 56 of such diameter as to accommodate one end 57 of the pipe 53 therein. The pipe 53 should be thrust into the bore 56 of the fitting until the end 57 of the pipe abuts the shoulder 55, as is shown in FIG. 4. The clamp 1 then may be applied to the pipe 53. This is accomplished by moving the spacers 16 and 27 away from one another and fitting the jaws 11 and 12 on the pipe so that the jaws abut the end of the fitting 52. The arms 2 and 10 of the clamp then may be locked so as to maintain the pipe 53 gripped between the jaws 11 and 12.

With the pipe 53 clamped between the jaws 11 and 12, the end 57 of the pipe abutting the shoulder 56, and the jaws 11 and 12 abutting the end of the fitting 52, the handle 41 of the operating means 40 may be rocked counterclockwise about the fulcrum 26 so as to cause the yoke 31 to move downwardly from the position shown in FIGS. 4 and 5 toward the axes of the fitting 52 and the pipe 53. As the yoke moves downwardly, the marking tool or scribe 37 will engage the body 54 of the fitting 52 and make a mark 58 on the body 54. Substantially simultaneously, the scribe 38 will engage the pipe 54 and make a mark 59. The axial distance between the marks 58 and 59 is designated X in FIG. 4.

Any differences in height between the scribes 37 and 38 and the levels of the surfaces of the fitting 52 and the pipe 53 may be compensated for by the different levels of the scribes and by the ability of the arms 32, 33 and the crossbar 34 of the yoke 31 to rock relatively to one another and to the handle 40 as is permitted by the pins and slots 35, 36 and the pin 43.

If desired, the scribes 37 and 38 may be maintained in engagement with the fitting and the pipe and the clamp 1 rotated a short distance about the axis of the pipe. This will enable the marks 58 and 59 to be elongated, thereby making them more recognizable and facilitating measuring the distance between them.

Following making the marks 58 and 59 on the fitting and the pipe, respectively, the fitting may be moved axially of the pipe toward the left, as viewed in FIG. 4, so as to unseat the end 57 of the pipe from the shoulder 55. Thereafter, the spacers 16 and 27 may be slid toward one another so as to lie alongside the respective clamp jaws. The fitting 52 then may be moved relatively to the pipe 53 so that the end of the fitting bears against the spacers 16 and 27, rather than against the adjacent ends of the jaws 11 and 12. There thus will be provided between the end 57 of the pipe 53 and the shoulder 55 of the fitting 52 a space or gap G (FIG. 5) corresponding to the thickness t of each of the spacers. Typically, the width of the gap G will be 0.125 inch, but the width of the gap may be more or less, as desired.

With the fitting 52 maintained in abutting relation with the spacers 16 and 27, the fitting may be tack welded to the pipe, following which the clamp 1 may be removed from the pipe and the weld completed. The axial distance between the inscribed marks 58 and 59 will correspond to the fixed distance X between the scribes 37 and 38, plus the thickness t of the spacers 16, 27. This distance is designated X+t in FIG. 5.

When the weld between the fitting 52 and the pipe 53 is inspected, the inspector may measure the distance between the marks 58 and 59. If the distance is not greater than the distance X between the scribes 37 and 38, the inspector will know that the welder did not provide the appropriate gap G between the pipe end and the fitting shoulder 56. If the distance between the marks 58 and 59 is greater than the distance X, however, then the inspector will know that a gap has been provided between the pipe end and the fitting shoulder.

The embodiment of the invention shown in FIGS. 6–9 incorporates many of the parts of the earlier described embodiment, and corresponding parts are identified by corresponding reference characters.

The embodiment of FIGS. 6–9 comprises a yoke 61 having a crossbar 62 pivoted by means of pins 63 to arms 64 and 65 which slideably extend through the guides 29 and 30 and are equipped with relatively blunt markers or scribes 66 and 67 at their lower ends. The arms 64 and 65 are encircled by springs 68, 69 which react between the crossbar 62 and the guides 29 and 30 and bias the yoke 61 upwardly to a neutral or inactive position.

The members 23 and 24 of the bracket 22 are spanned adjacent their upper ends by a reinforcing bar 70 in lieu of the bar 26. The members 23 and 24 of the bracket 22 also are spanned adjacent their lower ends by a rod 71. A pair of tension springs 72 and 73 are secured at corresponding ends to the rod 71 and at their opposite ends to one flange 74 of a bracket 75 that is fixed to the yoke crossbar 62. The springs 72 and 73 normally maintain the yoke 61 in a neutral or inactive position from which it may move either toward or away from a pipe clamped between the jaws 11 and 12.

Operating means for effecting movements of the yoke 61 is designated generally by the reference character 76 and comprises a lever 77 pivoted by means of a pivot pin 78 on a bracket 79 that is fixed to the arm 3 of the clamp 1. One end of the lever 77 is free, whereas the other end is pivoted by a pin 80 to a U-shaped link 81 having a base 82 and upstanding side walls 83 which straddle the lever 77. The free ends of the side walls 83 are rounded as is shown at 84 in FIG 9. The construction and arrangement of the link 81 are such that the link normally forms an elongate extension of the lever 77, as is shown in full lines in FIG. 9, and may be rocked counterclockwise from the full line position shown in FIG. 9, but may not be rocked clockwise from that position because of the engagement of the base 82 with the lever 77.

The yoke operating means 76 also includes a flange 85 forming part of the bracket 75 and which projects beyond the crossbar 62 of the yoke 61 so as normally to overlie the link 81. See FIG. 9.

The embodiment of FIGS. 6–9 also includes a pair of stabilizers 86, each of which comprise a housing 87 welded or otherwise suitably fixed to the guide 29. From each of the housings projects a reciprocable plunger or foot 88 that is urged by a spring 89 in a downward direction, as viewed in FIGS. 6 and 7. Downward movement of each foot 88 is limited by a bolt 90 one end of which is threaded into a correspondingly threaded opening formed in a crossbar 91 of the associated foot and the other end of which slideably extends through an opening formed in a cap 92 of the associated housing 87. The exposed end of each bolt carries adjusting and lock nuts 93.

In the operation of the embodiment shown in FIGS. 6–9, the end of the pipe 53 is introduced into the bore 56 of the fitting 52 so that the free end of the pipe abuts the shoulder 55, in the same manner shown in FIG. 5. The jaws 11 and 12 then may be applied to the pipe in the manner described previously. In these positions of the parts the feet 88 of the stabilizers 86 preferably engage the fitting under a force exerted by the springs 89, as is shown in FIG. 6. The stabilizers 86 are so inclined to the vertical that a component of the spring force exerted on the fitting by the feet 88 will tend to move the fitting toward the pipe so that the free end of the pipe automatically is maintained firmly against the internal shoulder of the fitting.

When the pipe 53 is clamped between the jaws 11 and 12 and the fitting 52 is in place on the pipe, the operating lever 77 may be rocked counterclockwise about the axis of the pivot 78, as viewed in FIG. 6, so as to cause the link 81 to lift the yoke 61 via the flange 85 to a cocked position. As the yoke is lifted, the springs 68 and 69 will be compressed, as the spring 72 and 73 will be stretched. After the yoke 61 has been lifted to its cocked position, the free end of the link 81 will disengage the flange 85, whereupon the energy stored in the springs 68, 69, 72, and 73 will cause the yoke 61 to move rapidly and forcibly downwardly, thereby enabling the scribes 66 and 67 to strike the fitting and the pipe with sufficient force to make marks, like the marks 58 and 59, on the fitting and pipe.

Once the scribes have engaged and marked the fitting and pipe, the springs will return the yoke to its normal position, following which the spacers 16 and 17 may be used in the same manner described earlier to provide the gap G between the end of the pipe and the shoulder of the fitting.

Figure 9:
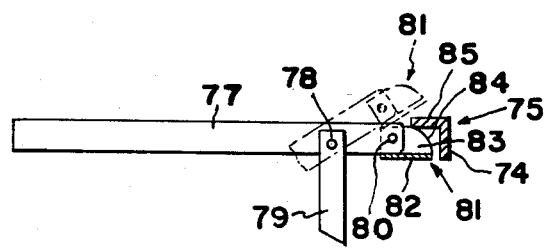
FIG. 9 is a sectional view taken along the line 9—9 of FIG. 8.

To restore the parts of the operating means 76 to the positions necessary to enable another pipe and fitting to be inscribed, the lever 76 may be rocked clock wise from the chain line position shown in FIG. 9. The free end of the link 81 will engage the upper surface of the flange 85, but since the link is rockable relatively to the lever 77 counterclockwise about its pivot 80, the link may be rocked to a position in which it passes the flange 85 and occupies a position in which it again underlies the flange.

The stabilizers 86 ensure that the fitting 52 is maintained in fixed position on the pipe regardless of vibrations or shocks which may result from the cocking and sudden release of the yoke 60.

The embodiment shown in FIG. 10 is like that shown in FIGS. 1-5 except that the clamp 1 is replaced by a clamp 95 having a tubular body 96 welded to the bracket member 25 by an arm 97. Rotably accommodated in the body 96 is a threaded shaft 98 which is journaled in a bearing assembly 99 fixed at the upper end of the body. A head 100 is secured to the shaft 98 to facilitate rotation thereof. Telescopingly accommodated in the body 96 is a sleeve 101 that is welded to the bracket 14 by an arm 102. The sleeve 101 has a threaded nut 103 secured at its open end and through which the correspondingly threaded shaft 98 extends. The bearing assembly prevents axial movement of the shaft 98 relative to the body 96, as a consequence of which rotation of the shaft effects relative movement of the body and the sleeve and movement of the clamp jaws 11 and 12 either toward or away from one another.

The operation of the apparatus shown in FIG. 10 is the same as that of the embodiment of FIGS. 1-5 except for the manner in which the jaws 11 and 12 are adjusted.

The disclosed embodiments are representative of presently preferred forms of the invention, but are intended to be illustrative rather than definitive thereof. The invention is defined in the claims.

I claim:

1. A tool for use in joining a pipe having a longitudinal axis to a fitting wherein one end of the pipe is to be accommodated in a bore at one end of the fitting and spaced a predetermined axial distance from a shoulder located axially inwardly from said one end of the fitting, said tool comprising clamp means for gripping said pipe adjacent said one end thereof with said one end of said pipe in engagement with said shoulder; first marking means carried by said clamp means for movements toward and away from the axis of a pipe gripped by said clamp means; second marking means carried by said clamp means for movements toward and away from such axis; means coupling said first and second marking means for conjoint movement, said first and second marking means being spaced from one another along the axis of said pipe a distance such that one of said marking means is engageable with a pipe gripped by said clamp means and the other of said marking means is engageable with a fitting accommodating such pipe; and operating means for moving said first and second marking means into engagement with said pipe and said fitting respectively with sufficient force as to provide marks on said pipe and said fitting spaced from one another a distance corresponding to the spacing between said first and second marking means.

2. A tool according to claim 1 including spring means yieldably biasing each of said marking means in a direction away from said axis.

3. A tool according to claim 1 including stabilizing means carried by said clamp means for engaging said fitting.

4. A tool according to claim 3 wherein said stabilizing means comprises a plunger engageable with said fitting, and means yieldably biasing said plunger toward engagement with said fitting.

5. A tool according to claim 1 including means mounting each of said marking means for movement by said operating means from a normal position to a cocked position, and driving means coupled to each of said marking means and operable to drive the latter from said cocked position forcibly toward and into engagement with said pipe and said fitting.

6. A tool according to claim 5 wherein said driving means comprises spring means.

7. A tool according to claim 1 including pivotal means connecting said operating means to said first and second marking means.

8. A tool according to claim 7 including spring means acting on said operating means and yieldably biasing the latter to a position in which said first and second marking means are disengaged from said pipe and said fitting.

9. A tool according to claim 1 including spacer means, and means mounting said spacer means on said clamp means for movements into and out of engagement with said pipe.

10. A tool according to claim 1 wherein each of said marking means comprises a scribe.

11. A tool for use in joining a pipe having a longitudinal axis to a fitting wherein one end of the pipe is to be accomodated in a bore at one end of the fitting and spaced a predetermined axial distance from a shoulder located axially inwardly from said one end of said fitting, said tool comprising a clamp having a pair of jaws movable into and out of clamping engagement with said pipe adjacent said one end thereof but axially spaced from said one end a distance corresponding to the axial distance from said one end of said fitting to said shoulder, thereby enabling at least one of said jaws to abut one end of said fitting when said one end of said pipe engages said shoulder; first and second marking means; means mounting said first marking means on said clamp for movements toward and away from the axis of said pipe; means mounting said second marking means on said clamp for movements toward and away from the axis of said pipe; means coupling said first and second marking means for conjoint movement, said first and second marking means being spaced from one another axially of said pipe a distance such that when said pipe is clamped between said jaws one of said marking means overlies said pipe and the other overlies said fitting, said one jaw abuts one end of said fitting, and said one end of said pipe engages said shoulder; and operating means for effecting movement of said first and second marking means into engagement with said pipe and said fitting with sufficient force to provide a mark on the surface of said pipe and said fitting.

12. A tool according to claim 11 including a spacer; and means mounting said spacer on said clamp for movements toward and away from said axis; said spacer being operable to occupy a position in engagement with said fitting between said one end of said one jaw and said one end of said fitting.

13. A tool according to claim 11 including spring means yieldably biasing each of said marking means in a direction away from said pipe and fitting.

14. A tool according to claim 11 including stabilizing means carried by said clamp for engaging said fitting.

15. A tool according to claim 11 including means mounting said marking means for movement from a normal position to a cocked position, said operating means being operable to effect movement of said marking means to said cocked position, and means coupled to said marking means and operable to drive said marking means from said cocked position forcibly toward and into engagement with said pipe and said fitting.

16. A tool according to claim 15 wherein said driving means comprises spring means.

17. A tool according to claim 11 wherein said operating means is pivotally connected to said first and second marking means.

18. A tool according to claim 17 including spring means acting on said operating means and yieldably biasing the latter to a position in which said first and second marking means are spaced from said pipe and said fitting.

19. A tool according to claim 11 wherein said operating means comprises a lever pivotally mounted on said clamp and means separably connecting one end of said lever to said marking means.

20. A tool according to claim 19 wherein the means separably connecting one end of said lever to said marking means comprises a link pivoted to said lever for movement in one direction from a normal position in which said link extends in prolongation of said lever.

21. A pipefitter's tool adapted for use in joining a pipe and a fitting, said tool comprising clamp means having a pair of jaws movable toward and away from one another for clamping and unclamping a pipe; first scribe means; second scribe means; means mounting each of said scribe means in spaced apart relation for movements toward and away from a pipe clamped between said jaws; means coupling said scribe means to one another for conjoint movement and operationg means connected to said scribe means for effecting movement of the latter.

22. A tool according to claim 21 including spring means biasing said scribe means to move in a direction away from such pipe.

23. A tool according to claim 21 wherein said coupling means comprises a link engageable and disengageable with said scribe means.

24. A tool according to claim 23 wherein said operating means comprises a lever and a link extending between said lever and said connecting means.

25. A tool according to claim 24 wherein said link is engageable with and disengageable from said coupling means.

26. A tool according to claim 24 wherein said link is pivoted to said coupling means.

27. A tool according to claim 21 including stabilizing means carried by said clamp means and extending in a direction toward and alongside one of said jaws.

* * * * *

UNITED STATES PATENT AND TRADEMARK OFFICE
CERTIFICATE OF CORRECTION

PATENT NO. : 4,553,305
DATED : November 19, 1985
INVENTOR(S) : Timothy C. Dearman It is certified that error appears in the above-identified patent and that said Letters Patent are hereby corrected as shown below:

Column 2, line 15, change "Appartus" to -- Apparatus -- .

Column 3, line 7, change "fiting" to -- fitting -- .

Column 3, line 32, change "gitidinally" to -- gitudinally -- .

Column 8, line 54, after "abut" insert -- said -- .

Column 10, line 16, change "operationg" to -- operating -- .

Column 10, line 17, change "movement" to -- movements --.

Signed and Sealed this

Fifteenth Day of April 1986

[SEAL]

Attest:

Attesting Officer

DONALD J. QUIGG

Commissioner of Patents and Trademarks